US012090621B2

(12) United States Patent
Li

(10) Patent No.: US 12,090,621 B2
(45) Date of Patent: Sep. 17, 2024

(54) ELECTRIC TOOL FEATURING QUICK ASSEMBLY AND ASSEMBLY LOCKING

(71) Applicant: Haihua Li, Nantong (CN)

(72) Inventor: Haihua Li, Nantong (CN)

( * ) Notice: Subject to any disclaimer, the term of this patent is extended or adjusted under 35 U.S.C. 154(b) by 0 days.

(21) Appl. No.: 18/650,107

(22) Filed: Apr. 30, 2024

(65) Prior Publication Data

US 2024/0278413 A1 Aug. 22, 2024

Related U.S. Application Data

(63) Continuation of application No. PCT/CN2022/091567, filed on May 7, 2022.

(30) Foreign Application Priority Data

Nov. 3, 2021 (CN) ......................... 202122677565.1
Dec. 6, 2021 (CN) ......................... 202123031494.4

(51) Int. Cl.
*B25F 5/02* (2006.01)

(52) U.S. Cl.
CPC ..................................... *B25F 5/02* (2013.01)

(58) Field of Classification Search
CPC .................................... B25F 5/02; B25F 3/00
See application file for complete search history.

(56) References Cited

FOREIGN PATENT DOCUMENTS

| | | | |
|---|---|---|---|
| CN | 2409024 | Y | 12/2000 |
| CN | 1381336 | A | 11/2002 |
| CN | 111673145 | A | 9/2020 |
| CN | 112207770 | A | 1/2021 |
| CN | 112659063 | A | 4/2021 |
| EP | 1681138 | A2 | 7/2006 |

*Primary Examiner* — Daniel Jeremy Leeds
(74) *Attorney, Agent, or Firm* — Bayramoglu Law Offices LLC

(57) ABSTRACT

An electric tool featuring quick assembly and assembly locking includes a base body and a tool body detachably connected to the base body, where a drive shaft connected to a motor is provided in a housing of the base body; a spline tooth movable along the drive shaft is sleeved on an end of the drive shaft; a rotation limit structure is provided between the drive shaft and the spline tooth; an end of the tool body is provided with a connecting sleeve; and a spline hole matched with the spline tooth is provided in the connecting sleeve. The electric tool achieves quick assembly and locking between the base body and the tool body, facilitating quick replacement of different tool heads according to work requirements and ensuring assembly reliability and operational safety.

20 Claims, 15 Drawing Sheets

Detail of A

ELECTRIC TOOL FEATURING QUICK ASSEMBLY AND ASSEMBLY LOCKING

CROSS REFERENCE TO THE RELATED APPLICATIONS

This application is the continuation application of International Application No. PCT/CN2022/091567, filed on May 7, 2022, which is based upon and claims priority to Chinese Patent Applications No. 202122677565.1, filed on Nov. 3, 2021, and No. 202123031494.4, filed on Dec. 6, 2021, the entire contents of which are incorporated herein by reference.

TECHNICAL FIELD

The present disclosure relates to the technical field of electric tools, and in particular to an electric tool featuring quick assembly and assembly locking between a base body portion and a tool body portion of the electric tool.

BACKGROUND

Electric tools are mainly used for applications such as metal cutting, grinding, assembly, and railway, and common electric tools include electric drills, electric hammers, electric impact drills, etc. In the past, electric tools were generally operated by professionals. With the popularization of large-capacity batteries, especially lithium batteries, electric tools with various functions in professional fields have entered thousands of households and are widely used in households. Against this backdrop, higher requirements are put forward for operational convenience and safety of electric tools.

The electric tool mainly includes a base body and a tool body located at an end of the base body. For ease of use, in the prior art, the base body and the tool body are usually detachable, and the tool body is replaceable to achieve different functions. In practical use, the base body and the tool body are coupled by a spline tooth and a spline hole, and their assembly requires tooth-hole alignment. However, the positions of spline holes on different tool bodies may vary, making it hard for the tool body to be quickly inserted into the base body, thereby resulting in assembly difficulties and affecting the operator's use.

In addition, the tool bodies of current electric tools are mostly directly connected to the base body in a screw thread manner, which cannot achieve quick disassembly and assembly. In addition, due to the strong vibrations of the electric tool during operation, the connection between the base body and the tool body is prone to loosen, thereby causing the tool body to shake and affecting the operator's use.

SUMMARY

In view of the application requirements of electric tools, an objective of the present disclosure is to provide an electric tool featuring quick assembly and assembly locking between a tool body and a base body of the electric tool. The present disclosure reduces the difficulty of operation and improves operational reliability and safety.

The present disclosure provides an electric tool featuring quick assembly and assembly locking, including a base body and a tool body detachably connected to the base body, where a drive shaft connected to a motor is provided in a housing of the base body; a spline tooth is sleeved on an end of the drive shaft adjacent to the tool body; the spline tooth is movable axially along the drive shaft; a rotation limit structure is provided between the drive shaft and the spline tooth, allowing the spline tooth to rotate with the drive shaft; an end of the tool body adjacent to the base body is provided with a connecting sleeve; a spline hole matched with the spline tooth is provided in the connecting sleeve; an elastic member is further sleeved on the drive shaft; and one end of the elastic member is connected to the drive shaft, and the other end of the elastic member is connected to the spline tooth;

an insert hole portion is further provided in the housing; one end of the tool body is provided with a connecting head matched with the insert hole portion, and the other end of the tool body is provided with a tool head for mounting a machining tool; a locking mechanism is provided between the connecting head and the housing; the locking mechanism includes a locking sleeve provided on the housing; the locking sleeve is provided with a first locking portion, and the connecting head is provided with a second locking portion matched with the first locking portion; and when the locking sleeve is rotated, the first locking portion and the second locking portion are locked or unlocked.

Preferably, the end of the drive shaft is provided with a limit portion abutting against an outer end surface of the spline tooth.

Preferably, the limit portion includes a limit groove formed in the drive shaft and a limit member located in the limit groove.

Preferably, the limit member is a rubber ring.

Preferably, the rotation limit structure includes a planar portion arranged axially along the drive shaft; and a mounting hole inside the spline tooth is matched with the drive shaft.

Preferably, two or more planar portions are arranged in a circumferential array around an axis of the drive shaft.

Preferably, the rotation limit structure includes a protruding portion located on the drive shaft and a recessed portion located inside the spline tooth and matched with the protruding portion.

Preferably, an end of the spline tooth adjacent to the connecting sleeve is provided with a guide portion.

Preferably, the first locking portion includes first stoppers provided on an inner wall of the locking sleeve; the second locking portion includes second stoppers provided on a circumferential wall of the connecting head; and when the locking sleeve is rotated, the first stoppers abut against or are misaligned with the second stoppers.

Preferably, the locking mechanism further includes a toggle member for adjusting rotation of the locking sleeve; and the toggle member is provided with a fixing portion connected to the locking sleeve and a toggle portion provided on the fixing portion and extending out of the housing.

Preferably, the locking mechanism further includes a fixed base, where the fixed base is located inside the housing, and the locking sleeve is located inside the fixed base.

Preferably, the locking mechanism further includes a tightness adjustment mechanism; and the tightness adjustment mechanism includes: at least two adjustment slots formed in the fixed base, where each of the adjustment slots is provided with a guide side wall; and an adjustment element provided on the fixing portion, where a bottom of the adjustment element is clamped into the adjustment slot; and driven by the toggle member, the adjustment element moves along the guide side wall from one adjustment slot into an adjacent adjustment slot.

Preferably, the locking sleeve is provided with a clamping portion, and the fixing portion is provided with a clamping groove matched with the clamping portion.

Preferably, an inner wall of the fixed base is provided with a mounting groove for mounting a retaining ring; and the retaining ring is configured to abut against an outer side of the locking sleeve.

Preferably, the base body further includes a switch control mechanism provided inside the housing; and the switch control mechanism is configured to lock or unlock a switch.

Preferably, the base body further includes a reverse rotation controlling mechanism located inside the housing; and the reverse rotation controlling mechanism is provided with a control button extending out of the housing.

Preferably, the control button is provided with a protrusion; and the reverse rotation controlling mechanism further includes: a locking member provided with a through slot sleeved outside the protrusion; and an elastic member having one end connected to the housing and the other end connected to the locking member.

In the electric tool featuring quick assembly and assembly locking provided by the present disclosure, the spline tooth is movably sleeved on one end of the drive shaft, allowing the spline tooth to be movable axially along the drive shaft. When the spline tooth is not aligned with the spline hole, the motor drives the drive shaft, thereby driving the spline tooth to rotate, allowing the spline tooth to quickly align with the spline hole. The spline tooth moves forward under the action of the elastic member and is inserted into the spline hole, thereby achieving quick connection between the drive shaft and the connecting sleeve. The connecting head and the housing are locked and unlocked through the locking mechanism between the connecting head and the housing. The design achieves quick disassembly and assembly of the base body and the tool body, and ensures stable connection between the base body and the tool body. During operation, the base body and the tool body are not easily loosened, avoiding vibration of the tool body, thereby improving the machining effect and ensuring operational safety.

BRIEF DESCRIPTION OF THE DRAWINGS

To describe the technical solutions in the embodiments of the present disclosure or in the prior art more clearly, the drawings required for describing the embodiments or the prior art will be described briefly below. Apparently, the drawings in the following description show some embodiments of the present disclosure, and a person of ordinary skill in the art may still derive other drawings from these drawings without creative efforts.

REFERENCE NUMERALS

Figure 1:
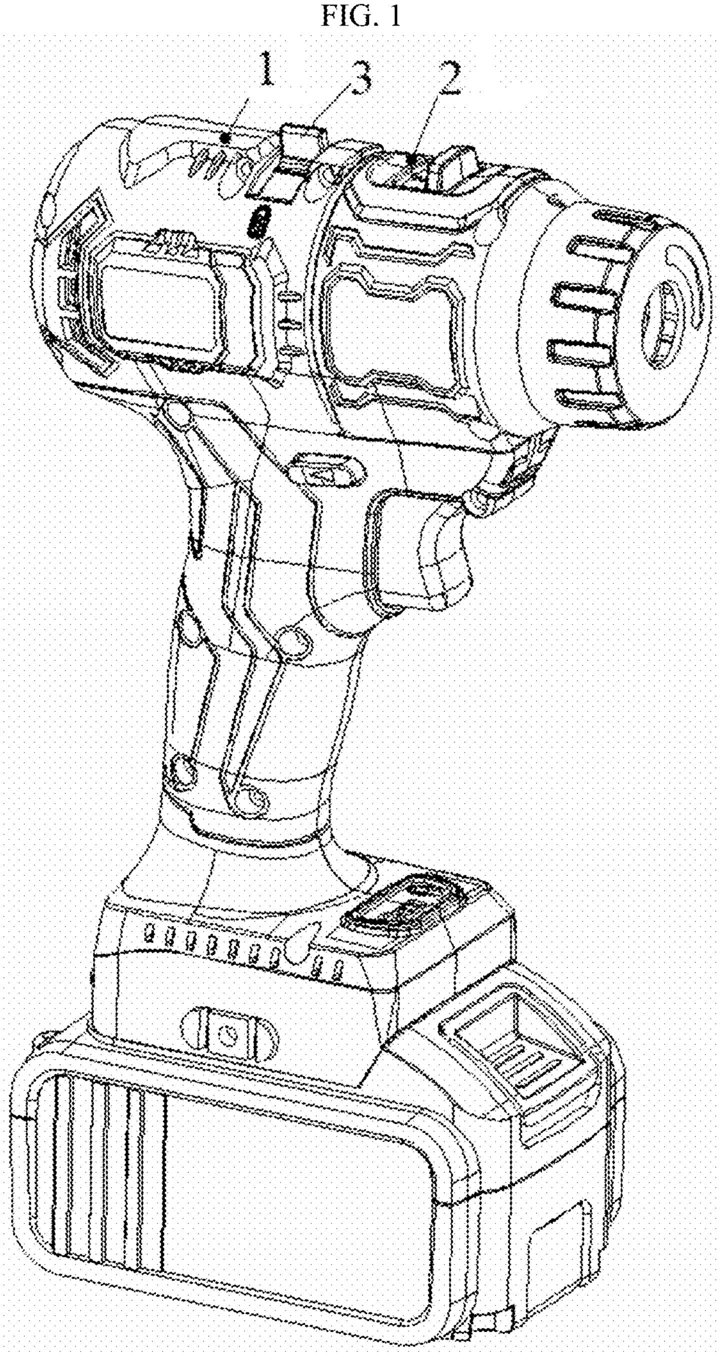
FIG. 1 is a three-dimensional structural diagram of a quick-assembly electric tool according to an implementation of the present disclosure.

1. base body; 2. tool body; 3. locking mechanism; 10. drive shaft; 111. limit groove; 112. planar portion; 211. spline hole; 11. housing; 12. switch; 13. switch control mechanism; 14. reverse rotation controlling mechanism; 20. connecting sleeve; 21. connecting head; 22. tool head; 301. locking sleeve; 32. toggle member; 33. fixed base; 34. adjustment element; 110. insert hole portion; 131. stopper; 141. control button; 142. locking member; 143. elastic member; 210. second locking portion; 30. spline tooth; 31. guide portion; 311. first locking portion; 312. clamping portion; 321. fixing portion; 322. toggle portion; 331. adjustment slot; 332. mounting groove; 1411. protrusion; 1421. through slot; 3211. clamping groove; and 40. elastic member.

DETAILED DESCRIPTION OF THE EMBODIMENTS

In order to enable those skilled in the art to better understand the technical solution of the present disclosure, the present disclosure will be described in detail below with reference to drawings. The description in this section is merely exemplary and explanatory and should not have any limitation on the protection scope of the present disclosure.

It should be noted that similar reference signs represent similar items in the drawings. Therefore, once an item is defined in one drawing, it does not need to be further defined and described in subsequent drawings.

It should be noted that orientations or position relationships indicated by terms “center”, “upper”, “lower”, “left”, "right", "vertical", "horizontal", "inner", "outer", etc. are orientation or position relationships shown in the drawings, and these terms are only used to facilitate description of the present disclosure and simplify the description, but not to indicate or imply that the mentioned apparatus or components must have a specific orientation or must be established and operated in a specific orientation, and thus these terms cannot be understood as a limitation to the present disclosure. In addition, the terms such as "first" and "second" are used only for distinguishing description and cannot be understood as indicating or implying relative importance.

Moreover, terms such as "horizontal", "vertical", and "overhanging" do not mean that a component is absolutely horizontal or overhanging, but that it can be tilted slightly. If "horizontal" only means that a direction of the component is more horizontal than "vertical", it does not mean that the structure must be completely horizontal, but can be tilted slightly.

In the description of the present disclosure, it should be noted that, unless otherwise clearly specified and limited, meanings of terms "install", "connected with", and "connected to" should be understood in a broad sense. For example, the connection may be a fixed connection, a removable connection, or an integral connection; may be a mechanical connection or an electrical connection; may be a direct connection or an indirect connection by using an intermediate medium; or may be intercommunication between two components. Those of ordinary skill in the art may understand specific meanings of the foregoing terms in the present disclosure based on a specific situation.

As shown in FIG. 1, an implementation provides an electric tool featuring quick assembly and assembly locking, including base body 1, tool body 2, and locking mechanism 3 functioning after assembly of the base body 1 and the tool body 2.

As shown in FIGS. 2 to 8, a quick assembly structure and an assembly principle of the base body 1 and tool body 2 of the electric tool in the present disclosure are described as follows.

Drive shaft 10 connected to a motor is provided in housing 11 of the base body 1. Spline tooth 30 is sleeved on an end of the drive shaft 10 adjacent to the tool body 2. The spline tooth 30 is movable axially along the drive shaft 10, and a rotation limit structure is provided between the drive shaft 10 and the spline tooth 30, allowing the spline tooth 30 to rotate with the drive shaft 10.

An end of the tool body 2 adjacent to the base body 1 is provided with connecting sleeve 20. Spline hole 211 matched with the spline tooth 30 is provided in the connecting sleeve 20.

Elastic member 40 is further sleeved on the drive shaft 10. One end of the elastic member 40 is connected to the drive shaft 10, and the other end of the elastic member 40 is connected to the spline tooth 30.

The base body 1 includes a battery mounting seat located at a bottom and the housing located above the battery mounting seat. A cavity for accommodating the motor is provided inside the housing. The drive shaft 10 is connected to the motor for outputting a driving force. The drive shaft 10 is a stepped shaft, with one end extending towards the tool body 2. A mounting hole matched with an extended end of the drive shaft 10 is provided in the spline tooth 30. The mounting hole forms a clearance fit with the drive shaft 10, allowing the spline tooth 30 to be movable axially relative to the drive shaft 10.

The rotation limit structure is configured to position and fix a rotation direction of the drive shaft 10 and the spline tooth 30. The spline tooth 30 is rotatable with the drive shaft 10 under the drive of the motor.

Specifically, the rotation limit structure may include planar portion 112 arranged axially along the drive shaft 10. The mounting hole inside the spline tooth 30 is matched with the drive shaft 10 in terms of shape. Two or more planar portions 112 are arranged in a circumferential array around an axis of the drive shaft 10.

Of course, the rotation limit structure may also include a protruding portion located on the drive shaft 10 and a recessed portion located inside the spline tooth 30 and matched with the protruding portion. Through the insertion mating between the protruding portion and the recessed portion, the rotation direction of the drive shaft 10 and the spline tooth 30 is fixed.

The tool body 2 includes a housing mating with the base body 1. One end of the housing is provided with an insert head that is inserted into the base body 1. The connecting sleeve 20 is located inside the tool body 2. The connecting sleeve includes two ends. One end is provided with a mounting portion for mounting a workpiece, and the other end is fixed to the spline tooth 30 through the spline hole 211, allowing the connecting sleeve 20 to be integrally fixed with the drive shaft 10. In this way, under the drive of the motor, the drive shaft 10 can drive the connecting sleeve 20 and the workpiece to rotate together.

The elastic member 40 may be a spring or a rubber sleeve. The elastic member 40 is sleeved on the extended end of the drive shaft 10, and includes one end fixed to the drive shaft 10 and the other end fixed to the spline tooth 30.

The present disclosure provides a quick-assembly electric tool. During assembly, the tool body 2 is inserted into the base body 1, and the drive shaft 10 extends into the connecting sleeve 20. When the spline tooth 30 on the drive shaft 10 aligns with the spline hole 211 in the connecting sleeve 20, the spline tooth 30 is directly inserted into the spline hole 211 so as to fix the drive shaft 10 to connecting sleeve 20. When the spline tooth 30 on the drive shaft 10 is misaligned with the spline hole 211 in the connecting sleeve 20, the connecting sleeve 20 pushes the spline tooth 30 backward, and the elastic member 40 compresses. At this time, the motor is started, such that the drive shaft 10 drives the spline tooth 30 to rotate. When the spline tooth 30 rotates to align with the spline hole 211, the spline tooth 30 moves forward under the action of the elastic member 40, making it automatically inserted into the spline hole 211 and fixed to the connecting sleeve 20.

In the quick-assembly electric tool provided by the present disclosure, the spline tooth is movably sleeved on one end of the drive shaft, allowing the spline tooth to be movable axially along the drive shaft. When the spline tooth is not aligned with the spline hole, the motor drives the drive shaft, thereby driving the spline tooth to rotate, allowing the spline tooth to quickly align with the spline hole. The spline tooth moves forward under the action of the elastic member and is inserted into the spline hole, thereby achieving quick connection between the drive shaft and the connecting sleeve.

Further preferably, in this implementation, the end of the drive shaft 10 is provided with a limit portion abutting against an outer end surface of the spline tooth 30. The limit portion is mainly configured to limit the spline tooth 30 and prevent it from slipping off the drive shaft 10.

The limit portion includes limit groove 111 formed in the drive shaft 10 and a limit member located in the limit groove 111. The limit groove 111 may be an annular groove provided on a circumferential surface of the drive shaft 10, and the limit member may be a rubber ring connected to the annular groove.

Further, an end of the spline tooth 30 adjacent to the connecting sleeve 20 may be provided with guide portion 31. The guide portion 31 may be a bevel. The bevel facilitates the quick insertion of the spline tooth 30 into the connecting sleeve 20. Similarly, an end of the spline hole 211 adjacent to the spline tooth 30 may also be provided with a bevel.

As shown in FIGS. 9 to 15, in the electric tool of the present disclosure, the locking mechanism and locking principle after the assembly of the base body 1 and the tool body 2 are described in detail as follows.

Figure 2:
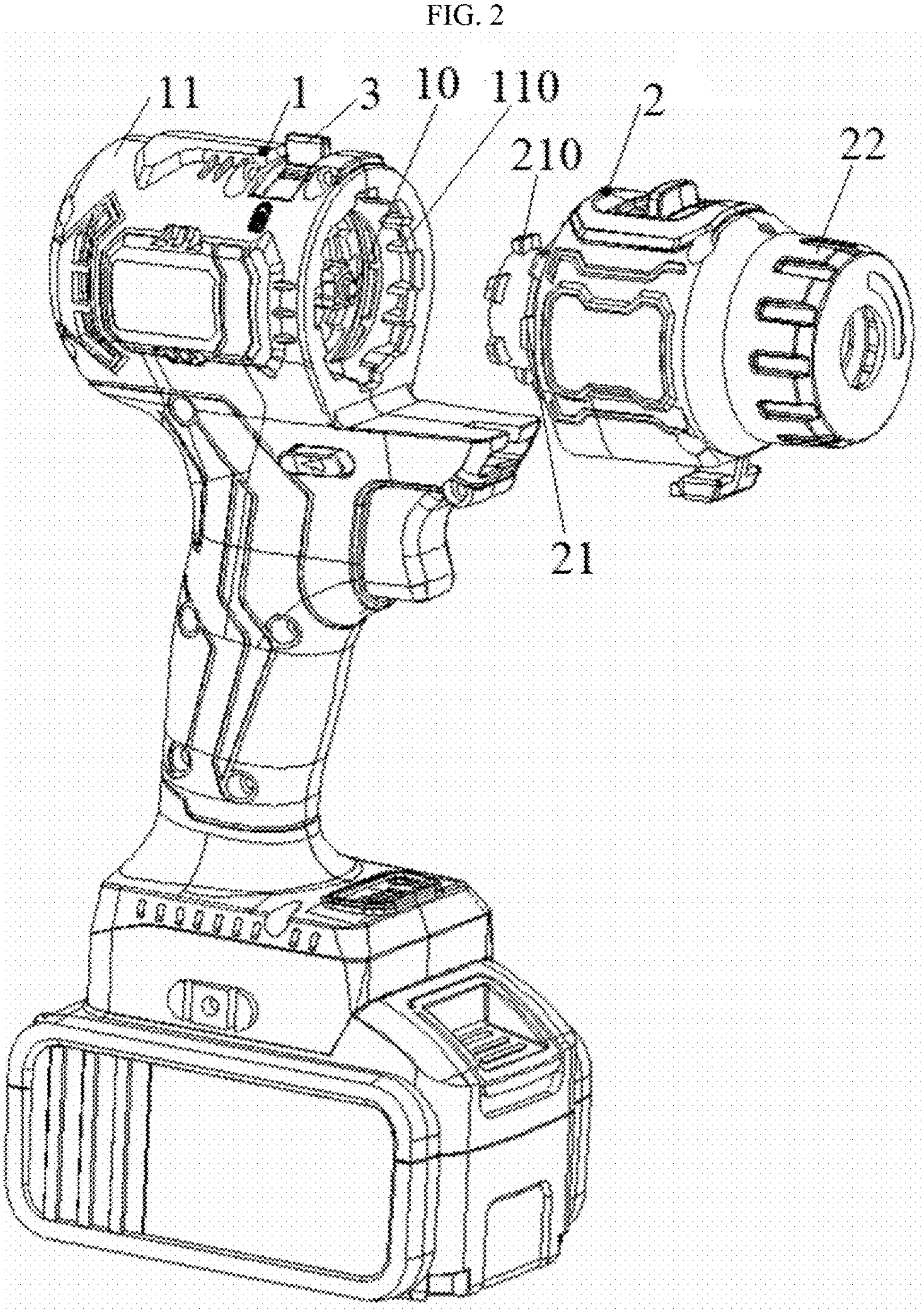
FIG. 2 is a split view of the quick-assembly electric tool according to an implementation of the present disclosure.
Figure 3:
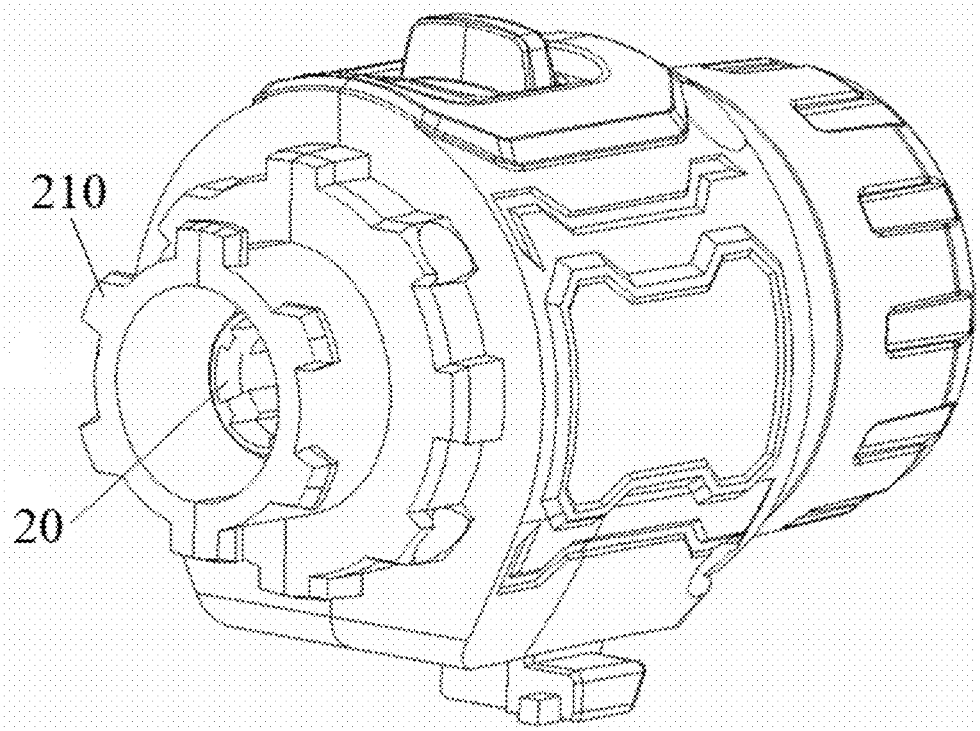
FIG. 3 is a three-dimensional structural diagram of a tool body of the quick-assembly electric tool according to an implementation of the present disclosure.
Figure 4:
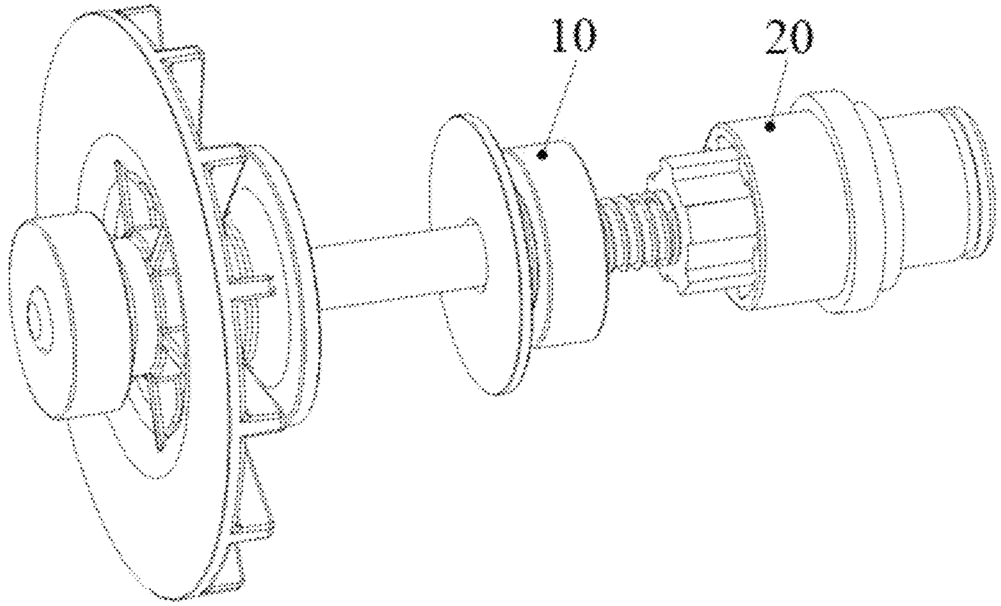
FIG. 4 is an assembly diagram of a drive shaft and a connecting sleeve of the quick-assembly electric tool according to an implementation of the present disclosure.
Figure 5:
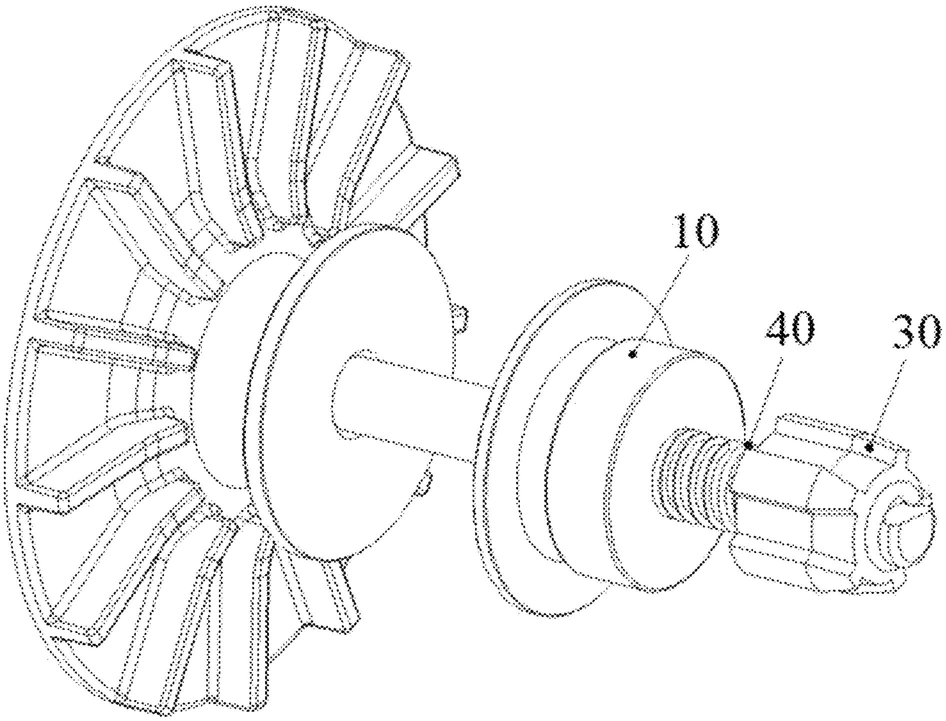
FIG. 5 is an assembly diagram of the drive shaft, a spline tooth, and an elastic member of the quick-assembly electric tool according to an implementation of the present disclosure.
Figure 6:
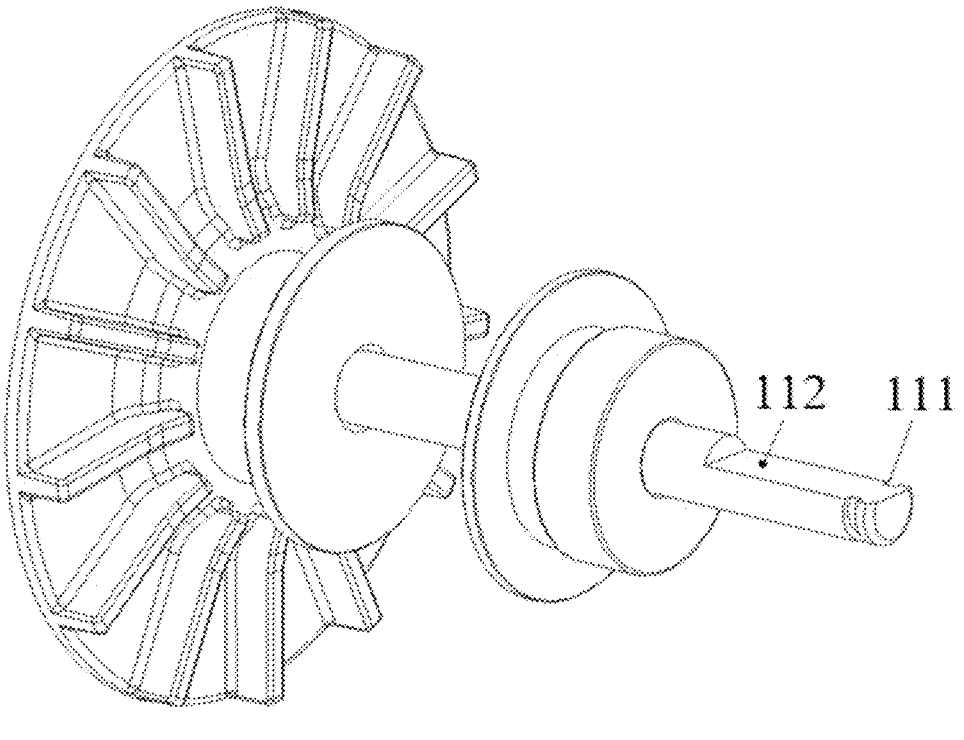
FIG. 6 is a three-dimensional structural diagram of the drive shaft of the quick-assembly electric tool according to an implementation of the present disclosure.
Figure 7:
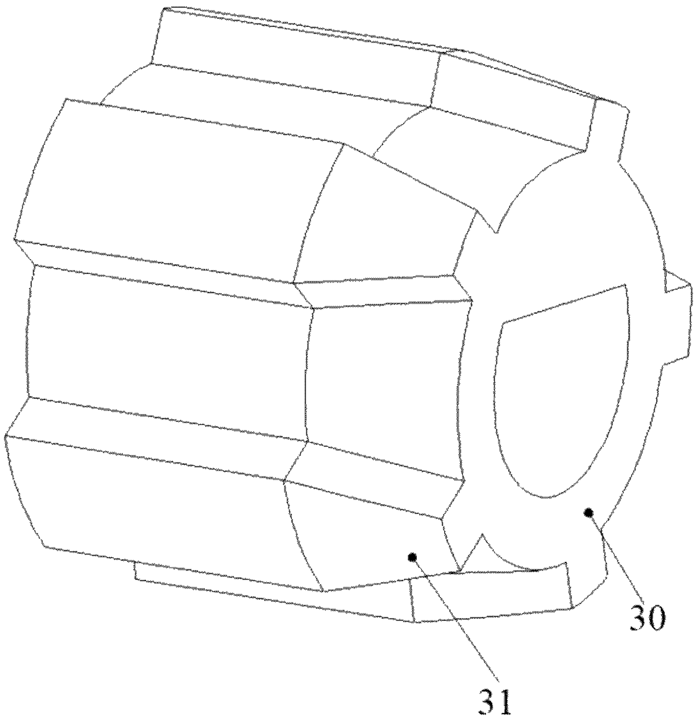
FIG. 7 is a three-dimensional structural diagram of the spline tooth of the quick-assembly electric tool according to an implementation of the present disclosure.
Figure 8:
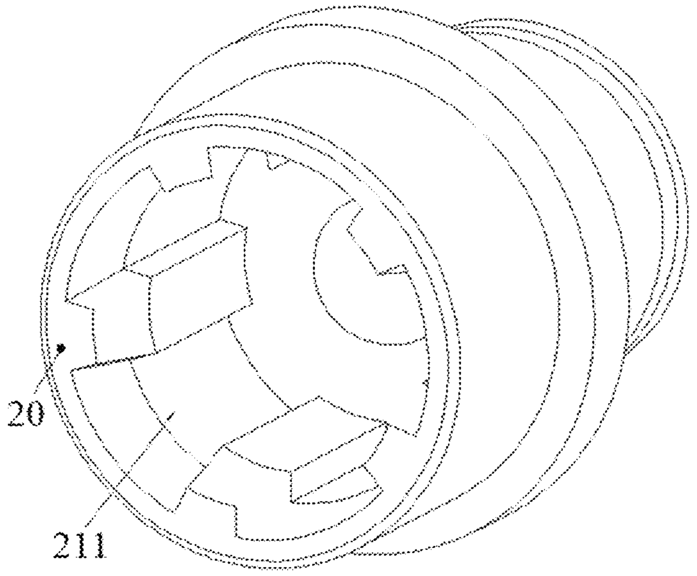
FIG. 8 is a three-dimensional structural diagram of the connecting sleeve of the quick-assembly electric tool according to an implementation of the present disclosure.
Figure 9:
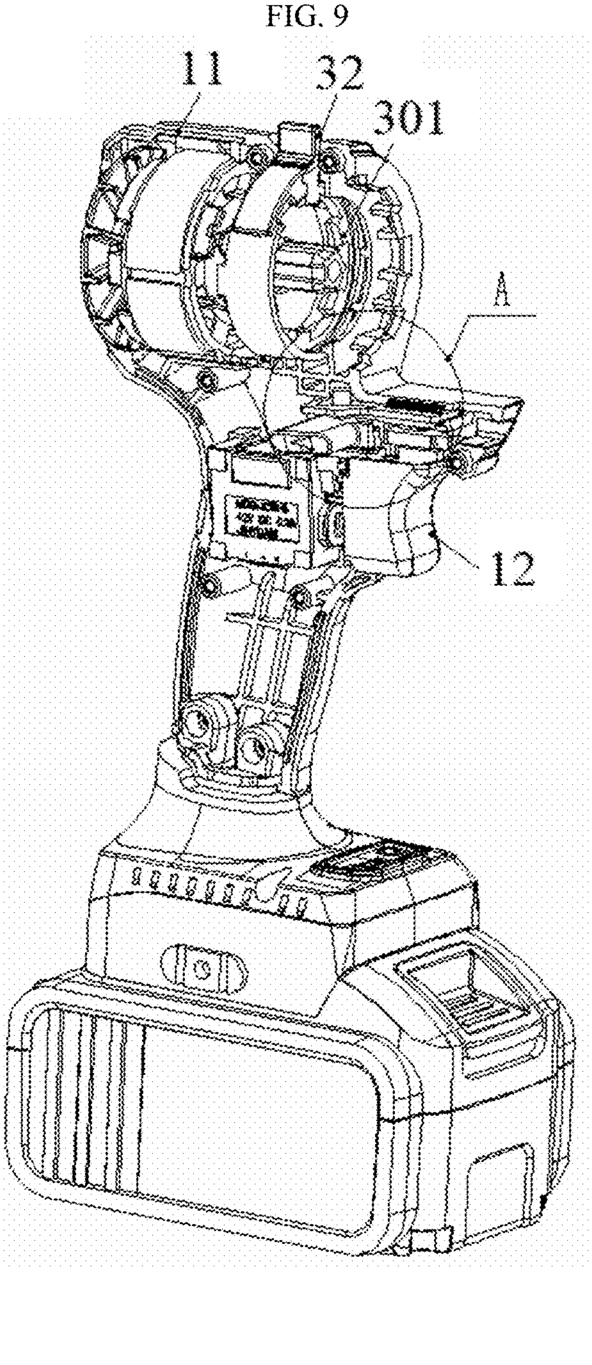
FIG. 9 is an internal view of a housing of the quick-assembly electric tool according to an implementation of the present disclosure.

As shown in FIGS. 2 and 9, the base body 1 includes the battery mounting seat located at the bottom and the housing 11 located above the battery mounting seat. The housing 11 is provided therein with a cavity for accommodating the motor and insert hole portion 110 communicated with the cavity at one end. The tool body 2 includes two ends. One end is provided with connecting head 21 matched with the insert hole portion 110, and the other end is provided with tool head 22 for mounting a machining tool. End surfaces of the insert hole portion 110 and the connecting head 21 can both be beveled to facilitate easy disassembly and assembly between the base body 1 and the tool body 2.

The locking mechanism 3 for locking the base body 1 and the tool body 2 is further provided between the connecting head 21 and the housing 11. The locking mechanism 3 includes locking sleeve 301 provided on the housing 11. The locking sleeve 301 is rotatable relative to the housing 11. The locking sleeve 301 is provided with first locking portion 311, and the connecting head 21 is provided with second locking portion 210 matched with the first locking portion 311.

When it is necessary to connect the base body 1 and the tool body 2, the connecting head 21 is inserted into the insert hole portion 110. The locking sleeve 301 is rotated to cause the first locking portion 311 to engage with the second locking portion 210, thereby locking and fixing the base body 1 and the tool body 2. When it is necessary to disassemble the tool body 2, the locking sleeve 301 is rotated to cause the first locking portion 311 to separate from the second locking portion 210, thereby unlocking the base body 1 and the tool body 2.

In the electric tool provided by this implementation, the connecting head and the housing are locked and unlocked through the locking mechanism between the connecting head and the housing. The design achieves quick disassembly and assembly of the base body and the tool body, and ensures stable connection between the base body and the tool body. During operation, the base body and the tool body are not easily loosened, avoiding vibration of the tool body, thereby improving the machining effect.

Specifically, the first locking portion 311 may include first stoppers provided on an inner wall of the locking sleeve 301. There are multiple first stoppers arranged at equal intervals around the circumferential inner wall of the locking sleeve 301. The second locking portion 210 may include second stoppers provided on a circumferential wall of the connecting head 21. There are multiple second stoppers arranged at equal intervals around a circumferential outer wall of the connecting head 21. When the locking sleeve 301 is rotated, the first stoppers abut against or are misaligned with the second stoppers to lock or unlock the base body 1 and the tool body 2.

To facilitate the rotation of the locking sleeve 301, the locking mechanism 3 may further include toggle member 32 provided on the housing 11. The toggle member 32 is provided with fixing portion 321 connected to the locking sleeve 301 and toggle portion 322 provided on the fixing portion 321 and extending out of the housing 11. The toggle member 32 drives the locking sleeve 301 to rotate, thereby quickly locking or unlocking the base body 1 and the tool body 2.

Specifically, the locking sleeve 301 may be fixedly connected to the fixing portion 321 by adhesive or a screw. Of course, in this implementation, for ease of assembly and disassembly, the locking sleeve 301 may be provided with clamping portion 312, and the fixing portion 321 is provided with clamping groove 3211 matched with the clamping portion 312. The clamping portion 312 may be in a T-shape, such that the locking sleeve 301 is firmly connected to the toggle member 32.

The locking mechanism 3 may further include fixed base 33. The fixed base 33 is configured to mount the locking sleeve 301 and plays a protective and supporting role for the locking sleeve 301. The fixed base 33 may be a circular shell with an opening at one end. The fixed base is located inside the housing 11, and the locking sleeve 301 is located inside an inner cavity of the fixed base 33 and is rotatable relative to the fixed base 33.

The locking mechanism 3 may further include a tightness adjustment mechanism. The tightness adjustment mechanism includes adjustment slots 331 and adjustment element 34. The adjustment slots 331 each are provided with a guide side wall and an arc-shaped or V-shaped cross-section that is concave downward. There are at least two adjustment slots 331 that are formed in the fixed base 33 and are entirely wavy. The adjustment element 34 is provided on the fixing portion 321 and is fixed integrally with the toggle member 32. A bottom of the adjustment element 34 is clamped into the adjustment slot 331. Driven by the toggle member 32, the adjustment element 34 moves along the guide side wall from one adjustment slot 331 into adjacent adjustment slot 331. The tightness adjustment mechanism is configured to adjust tightness between the base body 1 and the tool body 2.

An inner wall of the fixed base 33 may further be provided with mounting groove 332 for mounting a retaining ring. The retaining ring is configured to abut against an outer side of the locking sleeve 301 to limit and fix the locking sleeve 301, thereby preventing it from deviating.

Figure 10:
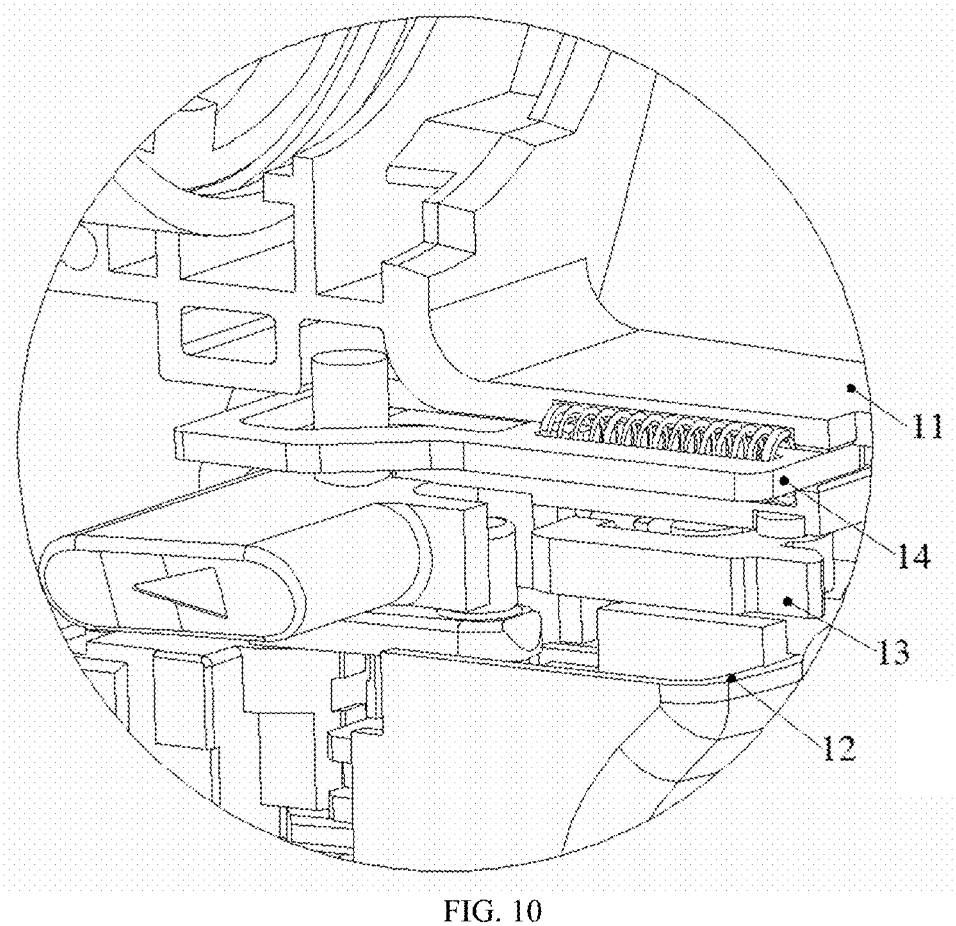
FIG. 10 is a detail of A shown in FIG. 9.
Figure 11:
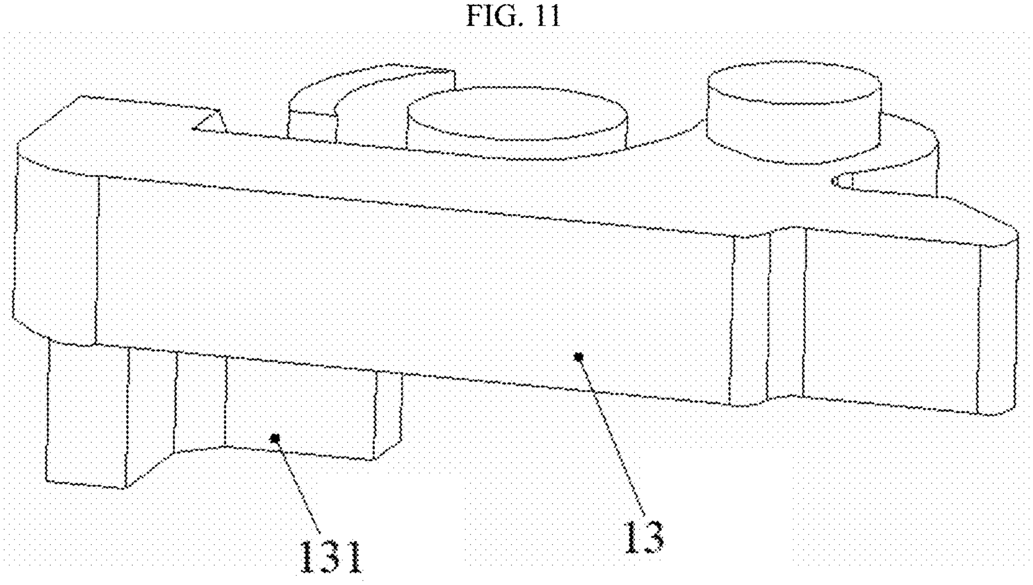
FIG. 11 is a three-dimensional structural diagram of a switch control mechanism of the quick-assembly electric tool according to an implementation of the present disclosure.

The base body 1 may further include switch control mechanism 13 provided inside the housing 11. The switch control mechanism 13 is configured to lock or unlock switch 12. Specifically, as shown in FIGS. 10 and 11, one end of the switch control mechanism 13 is rotatably connected to the housing 11, and the other end of the switch control mechanism 13 is provided with downwardly extending stopper 131. Before the tool body 2 is mounted, the switch control mechanism 13 is activated. The stopper 131 rotates and abuts against the switch 12 to lock the switch 12, preventing an operator from accidentally touching the switch 12, thereby avoiding safety accidents. After the tool body 2 is mounted in place, the stopper 131 rotates and moves away from the switch 12 to unlock the switch 12

The base body 1 may further include reverse rotation controlling mechanism 14 that is provided in the housing 11 and configured to control reversing of the tool head 22. The reverse rotation controlling mechanism 14 is provided with control button 141 extending out of the housing 11.

Figure 12:
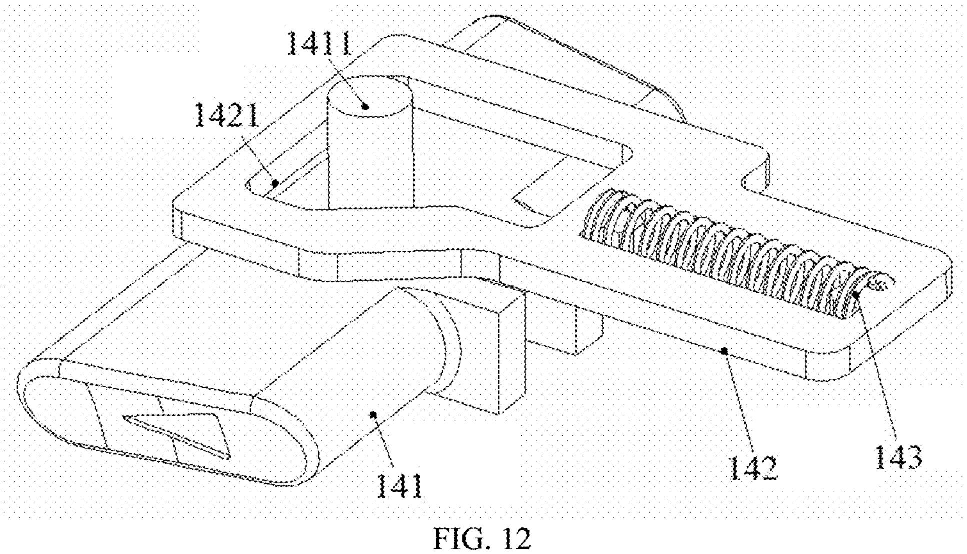
FIG. 12 is a three-dimensional structural diagram of a reverse rotation controlling mechanism of the quick-assembly electric tool according to an implementation of the present disclosure.
Figure 13:
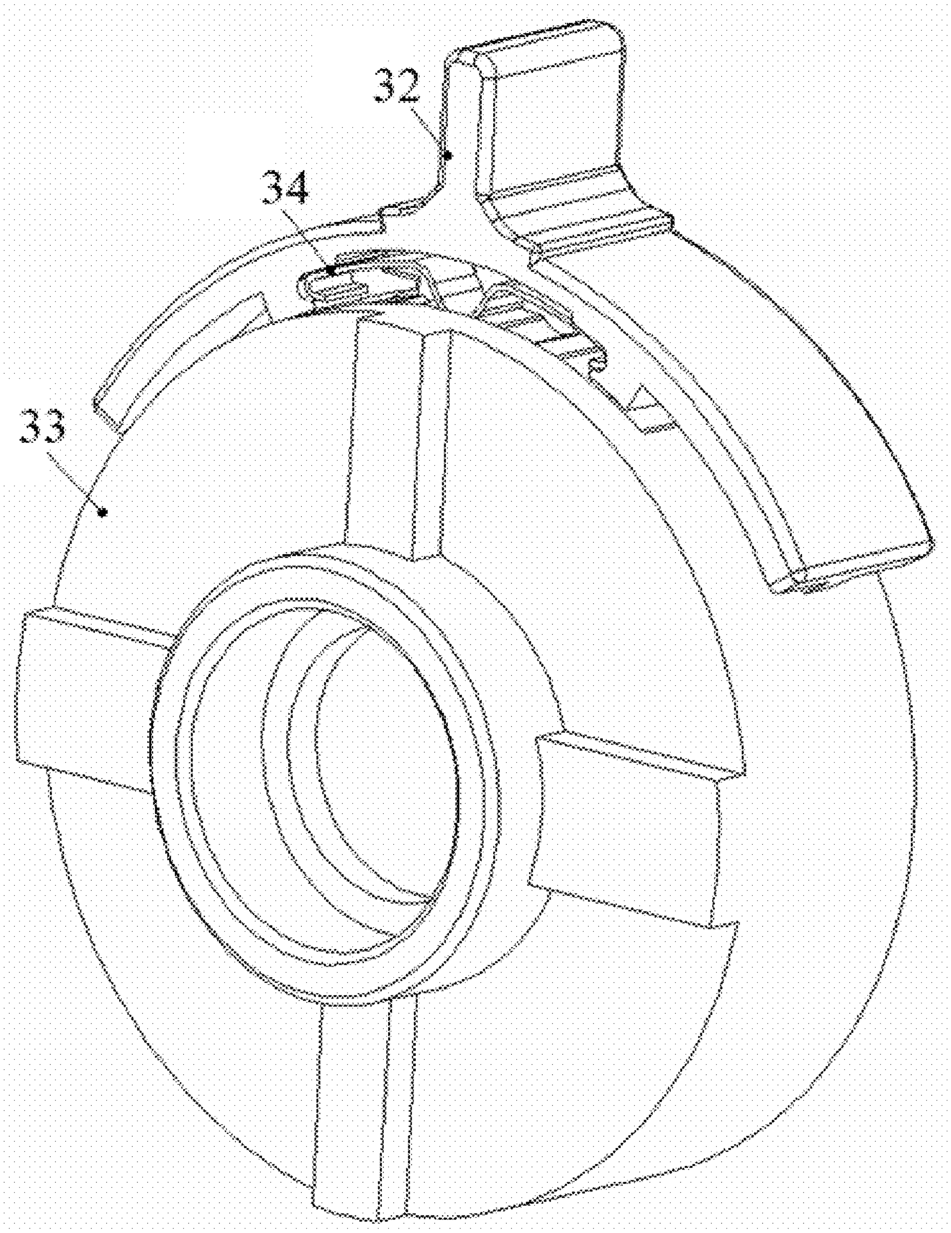
FIG. 13 is a three-dimensional structural diagram of a locking mechanism of the quick-assembly electric tool according to an implementation of the present disclosure.
Figure 14:
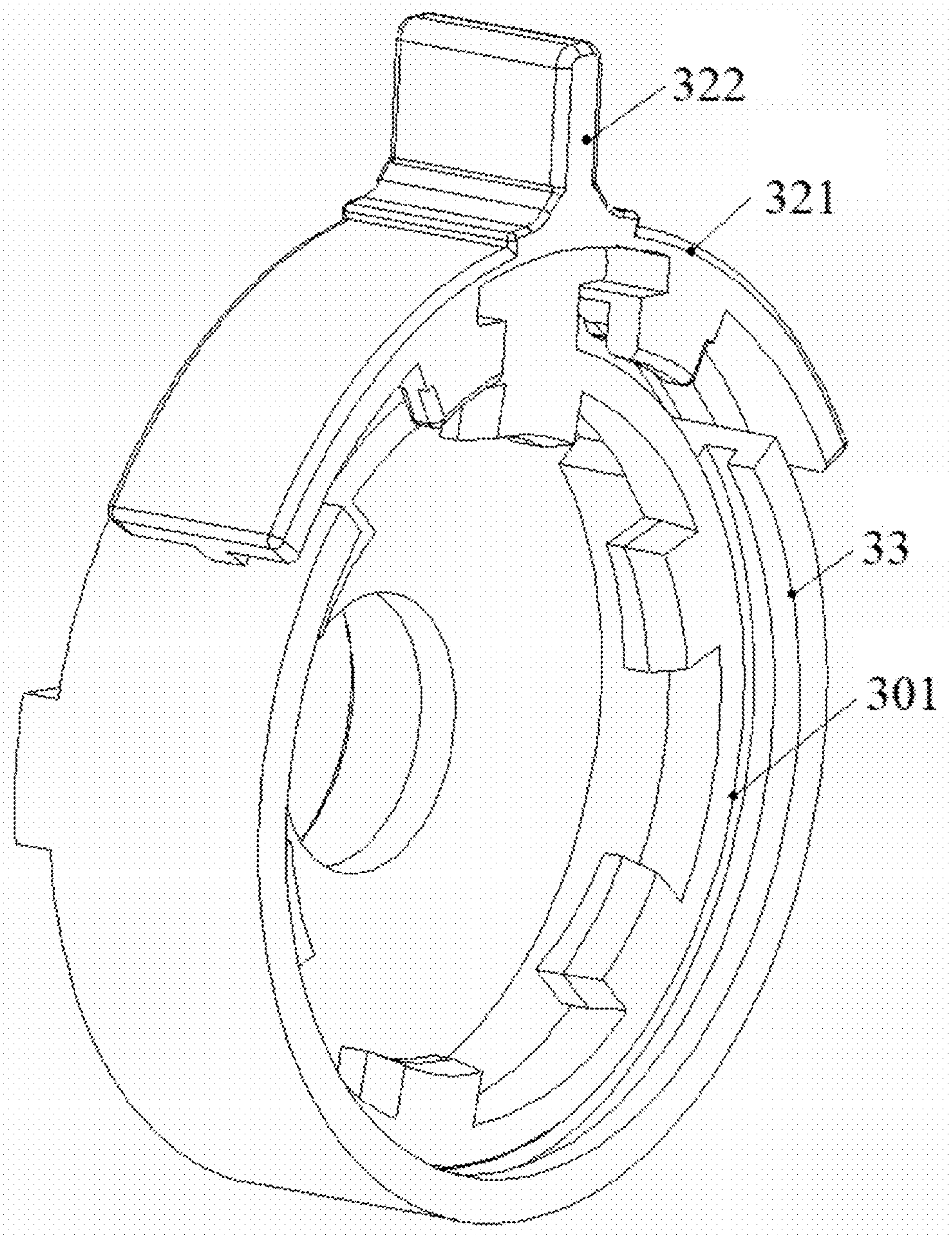
FIG. 14 is a three-dimensional structural diagram of the locking mechanism shown in FIG. 13 from another angle.
Figure 15:
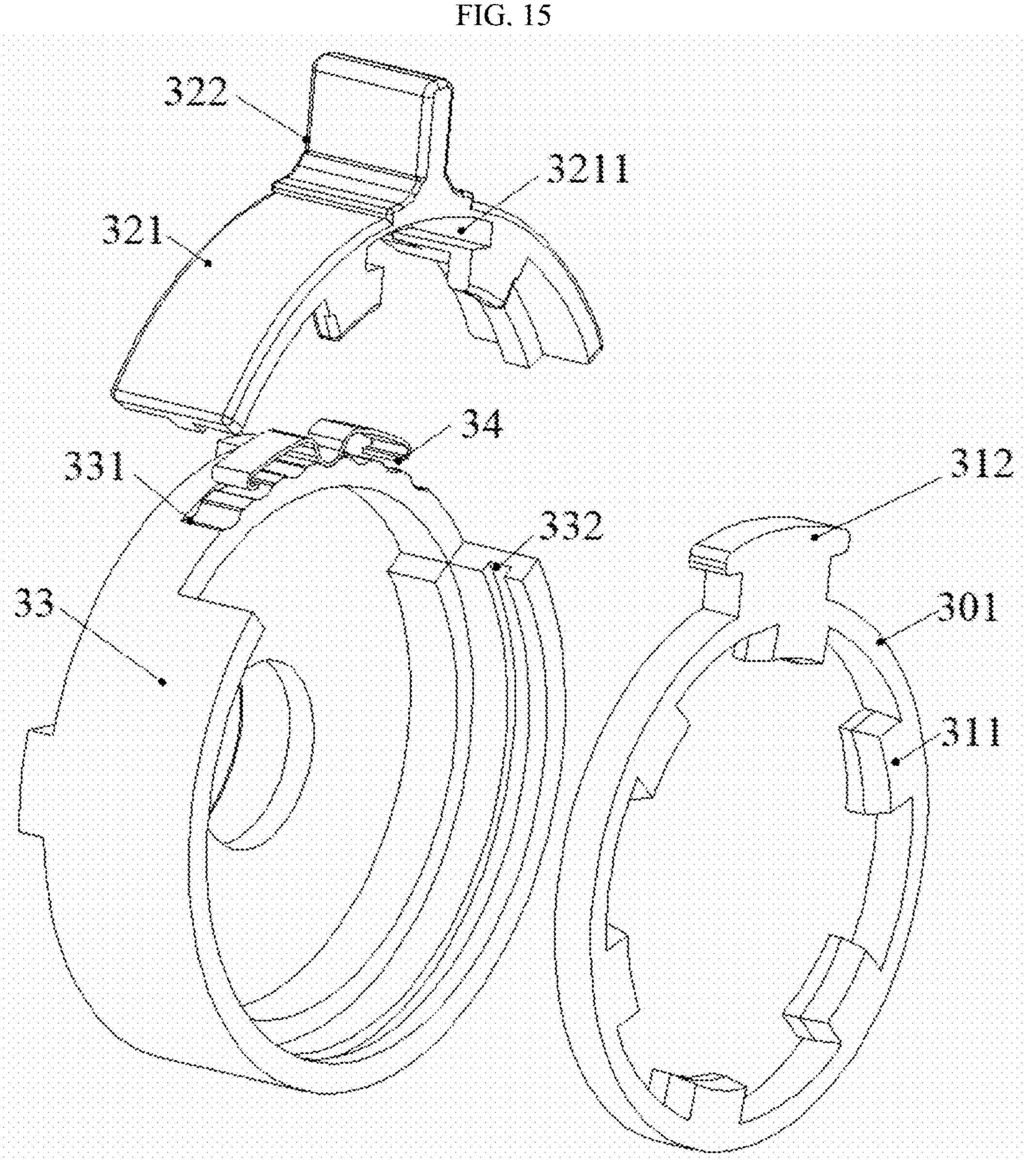
FIG. 15 is an exploded view of the locking mechanism of the quick-assembly electric tool according to an implementation of the present disclosure.

As shown in FIG. 12, the control button 141 is provided with protrusion 1411. The reverse rotation controlling mechanism 14 may further include locking member 142 and elastic member 143. The locking member 142 is provided with through slot 1421 sleeved outside the protrusion 1411. The elastic member 143 may be a spring, having one end connected to the housing 11 and the other end connected to the locking member 142.

Specifically, if the tool head 22 mounted does not have a reverse function, a rib at a bottom of the tool body 2 presses one end of the locking member 142. In this way, the locking member 142 moves backward along the through slot 1421 to press the protrusion 1411, thereby locking the control button 141. If the tool head 22 mounted has a reverse function, the rib at the bottom of the tool body 2 is removed. The locking member 142 resets forward under the action of the elastic member 143 to release the protrusion 1411, thereby unlocking the control button 141.

In the electric tool featuring quick assembly and assembly locking provided by the above embodiment of the present disclosure, the spline tooth is movably sleeved on one end of the drive shaft, allowing the spline tooth to be movable axially along the drive shaft. When the spline tooth is not aligned with the spline hole, the motor drives the drive shaft, thereby driving the spline tooth to rotate, allowing the spline tooth to quickly align with the spline hole. The spline tooth moves forward under the action of the elastic member and is inserted into the spline hole, thereby achieving quick connection between the drive shaft and the connecting sleeve. The connecting head and the housing are locked and unlocked through the locking mechanism between the connecting head and the housing. The design achieves quick disassembly and assembly of the base body and the tool body, and ensures stable connection between the base body and the tool body. During operation, the base body and the tool body are not easily loosened, avoiding vibration of the tool body, thereby improving the machining effect and ensuring operational safety.

It should be noted that terms “include”, “comprise” or any other variants thereof are intended to cover non-exclusive inclusion, so that a process, method, article or device including a series of elements includes not only those elements but also other elements not explicitly listed, or elements inherent to such a process, method, article, or device.

A specific example is applied herein to explain the principle and implementation of the present disclosure. The description of the foregoing example is only used to help understand the method of the present disclosure and core ideas thereof. The above described is only the preferred implementation of the present disclosure. It should be pointed out that since the text expression is limited while there are objectively infinite specific structures, those of ordinary skill in the art can also perform several improvements, embellishments or changes without departing from the principle of the present disclosure, or can combine the foregoing technical features in appropriate ways. These improvements, embellishments, changes or combinations, or those that directly apply the concepts and technical solutions of the present disclosure to other occasions without improvement, shall be regarded as falling within the protection scope of the present disclosure.

The invention claimed is:

1. An electric tool featuring quick assembly and assembly locking, comprising a base body and a tool body detachably connected to the base body, wherein a drive shaft connected to a motor is provided in a housing of the base body; a spline tooth is sleeved on an end of the drive shaft adjacent to the tool body; the spline tooth is movable axially along the drive shaft; a rotation limit structure is provided between the drive shaft and the spline tooth, allowing the spline tooth to rotate with the drive shaft; an end of the tool body adjacent to the base body is provided with a connecting sleeve; a spline hole matched with the spline tooth is provided in the connecting sleeve; a first elastic member is sleeved on the drive shaft; and a first end of the first elastic member is connected to the drive shaft, and a second end of the first elastic member is connected to the spline tooth; and an insert hole portion is provided in the housing; a first end of the tool body is provided with a connecting head matched with the insert hole portion, and a second end of the tool body is provided with a tool head for mounting a machining tool; a locking mechanism is provided between the connecting head and the housing; the locking mechanism comprises a locking sleeve provided on the housing; the locking sleeve is provided with a first locking portion, and the connecting head is provided with a second locking portion matched with the first locking portion; and when the locking sleeve is rotated, the first locking portion and the second locking portion are locked or unlocked.

2. The electric tool featuring quick assembly and assembly locking according to claim 1, wherein the end of the drive shaft is provided with a limit portion abutting against an outer end surface of the spline tooth.

3. The electric tool featuring quick assembly and assembly locking according to claim 2, wherein the limit portion comprises a limit groove formed in the drive shaft and a limit member located in the limit groove.

4. The electric tool featuring quick assembly and assembly locking according to claim 3, wherein the limit member is a rubber ring.

5. The electric tool featuring quick assembly and assembly locking according to claim 1, wherein the rotation limit structure comprises a planar portion arranged axially along the drive shaft; and a mounting hole inside the spline tooth is matched with the drive shaft.

6. The electric tool featuring quick assembly and assembly locking according to claim 5, wherein two or more planar portions are arranged in a circumferential array around an axis of the drive shaft.

7. The electric tool featuring quick assembly and assembly locking according to claim 1, wherein the rotation limit structure comprises a protruding portion located on the drive shaft and a recessed portion located inside the spline tooth and matched with the protruding portion.

8. The electric tool featuring quick assembly and assembly locking according to claim 1, wherein an end of the spline tooth adjacent to the connecting sleeve is provided with a guide portion.

9. The electric tool featuring quick assembly and assembly locking according to claim 1, wherein the first locking portion comprises first stoppers provided on an inner wall of the locking sleeve; the second locking portion comprises second stoppers provided on a circumferential wall of the connecting head; and when the locking sleeve is rotated, the first stoppers abut against or are misaligned with the second stoppers.

10. The electric tool featuring quick assembly and assembly locking according to claim 1, wherein the locking mechanism further comprises a toggle member for adjusting rotation of the locking sleeve; and the toggle member is provided with a fixing portion connected to the locking sleeve and a toggle portion provided on the fixing portion and extending out of the housing.

11. The electric tool featuring quick assembly and assembly locking according to claim 10, wherein the locking mechanism further comprises a fixed base, wherein the fixed base is located inside the housing, and the locking sleeve is located inside the fixed base.

12. The electric tool featuring quick assembly and assembly locking according to claim 11, wherein the locking mechanism further comprises a tightness adjustment mechanism; and the tightness adjustment mechanism comprises:

at least two adjustment slots, formed in the fixed base, wherein each of the at least two adjustment slots is provided with a guide side wall; and an adjustment element, provided on the fixing portion, wherein a bottom of the adjustment element is clamped into an adjustment slot of the at least two adjustment slots; and driven by the toggle member, the adjustment element moves along the guide side wall from one adjustment slot into an adjacent adjustment slot.

13. The electric tool featuring quick assembly and assembly locking according to claim 10, wherein the locking sleeve is provided with a clamping portion, and the fixing portion is provided with a clamping groove matched with the clamping portion.

14. The electric tool featuring quick assembly and assembly locking according to claim 11, wherein an inner wall of the fixed base is provided with a mounting groove for mounting a retaining ring; and the retaining ring is configured to abut against an outer side of the locking sleeve.

15. The electric tool featuring quick assembly and assembly locking according to claim 1, wherein the base body further comprises a switch control mechanism provided inside the housing; and the switch control mechanism is configured to lock or unlock a switch.

16. The electric tool featuring quick assembly and assembly locking according to claim 1, wherein the base body further comprises a reverse rotation controlling mechanism located inside the housing; and the reverse rotation controlling mechanism is provided with a control button extending out of the housing.

17. The electric tool featuring quick assembly and assembly locking according to claim 16, wherein the control button is provided with a protrusion; and the reverse rotation controlling mechanism further comprises:

a locking member, provided with a through slot sleeved outside the protrusion; and a second elastic member, having a first end connected to the housing and a second end connected to the locking member.

18. The electric tool featuring quick assembly and assembly locking according to claim 2, wherein the rotation limit structure comprises a planar portion arranged axially along the drive shaft; and a mounting hole inside the spline tooth is matched with the drive shaft.

19. The electric tool featuring quick assembly and assembly locking according to claim 3, wherein the rotation limit structure comprises a planar portion arranged axially along the drive shaft; and a mounting hole inside the spline tooth is matched with the drive shaft.

20. The electric tool featuring quick assembly and assembly locking according to claim 4, wherein the rotation limit structure comprises a planar portion arranged axially along the drive shaft; and a mounting hole inside the spline tooth is matched with the drive shaft.

* * * * *